(12) United States Patent
Ogasawara et al.

(10) Patent No.: US 9,718,311 B2
(45) Date of Patent: Aug. 1, 2017

(54) PNEUMATIC TIRE

(75) Inventors: Takuya Ogasawara, Tokyo (JP); Hideyuki Chiashi, Tokyo (JP); Hideki Kitano, Tokyo (JP)

(73) Assignee: BRIDGESTONE CORPORATION, Chuo-Ku, Tokyo (JP)

( * ) Notice: Subject to any disclaimer, the term of this patent is extended or adjusted under 35 U.S.C. 154(b) by 575 days.

(21) Appl. No.: 14/123,288

(22) PCT Filed: May 28, 2012

(86) PCT No.: PCT/JP2012/063665
§ 371 (c)(1),
(2), (4) Date: Jan. 15, 2014

(87) PCT Pub. No.: WO2012/165386
PCT Pub. Date: Dec. 6, 2012

(65) Prior Publication Data
US 2014/0124115 A1 May 8, 2014

(30) Foreign Application Priority Data

May 31, 2011 (JP) .................................. 2011-122888

(51) Int. Cl.
*B60C 1/00* (2006.01)
*B60C 5/14* (2006.01)
(Continued)

(52) U.S. Cl.
CPC .............. *B60C 5/14* (2013.01); *B60C 1/0008* (2013.04); *C09J 109/00* (2013.01); *C09J 115/00* (2013.01); *B60C 2005/145* (2013.04)

(58) Field of Classification Search
CPC .......... B60C 1/0008; B60C 5/14; B60C 5/142
See application file for complete search history.

(56) References Cited

U.S. PATENT DOCUMENTS

| 4,135,037 A * | 1/1979 | Udipi ...................... B32B 25/14 |
| | | 156/330 |
| 2005/0065266 A1 | 3/2005 | Yang et al. |
| (Continued) | | |

FOREIGN PATENT DOCUMENTS

| JP | 6-40207 A | 2/1994 |
| JP | 2002-155177 A | 5/2002 |
| (Continued) | | |

OTHER PUBLICATIONS

Communication dated Dec. 8, 2015 from the Japanese Patent Office issued in corresponding application No. 2013-518084.
(Continued)

*Primary Examiner* — Justin Fischer
(74) *Attorney, Agent, or Firm* — Sughrue Mion, PLLC

(57) ABSTRACT

A pneumatic tire includes: an inner liner having a thermoplastic resin film, a carcass, and an adhesive layer disposed between the inner liner and the carcass, in which the dynamic storage modulus E's at −20° C. of the thermoplastic resin film, the adhesive layer, and the carcass are defined as $E_1'$, $E_2'$, and $E_3'$, respectively, and the relationship among $E_1'$, $E_2'$, and $E_3'$ satisfies $E_1'>E_2'>E_3'$. This pneumatic tire has excellent anti-crack property in a low-temperature environment of the inner liner.

6 Claims, 1 Drawing Sheet

(51) Int. Cl.
*C09J 109/00* (2006.01)
*C09J 115/00* (2006.01)

(56) References Cited

U.S. PATENT DOCUMENTS

| 2009/0038728 | A1 | 2/2009 | Kanenari | |
|---|---|---|---|---|
| 2010/0024941 | A1 | 2/2010 | Hara et al. | |
| 2011/0024015 | A1* | 2/2011 | Takahashi | B60C 1/0008 |
| | | | | 152/510 |
| 2012/0070678 | A1* | 3/2012 | Takahashi | B60C 1/0008 |
| | | | | 428/474.4 |

FOREIGN PATENT DOCUMENTS

| JP | 2004-176048 A | 6/2004 |
|---|---|---|
| JP | 2005-089758 A | 4/2005 |
| JP | 2007-99146 A | 4/2007 |
| JP | 2007-276631 A | 10/2007 |
| JP | 2009-255601 A | 11/2009 |
| JP | 2010-507510 A | 3/2010 |
| WO | WO 2010/119685 * | 10/2010 |

OTHER PUBLICATIONS

Communication from European Patent Office issued Oct. 16, 2014 in counterpart European Patent Application No. 12792022.1.

* cited by examiner

PNEUMATIC TIRE

CROSS REFERENCE TO RELATED APPLICATIONS

This application is a National Stage of International Application No. PCT/JP2012/063665 filed May 28, 2012, claiming priority based on Japanese Patent Application No. 2011-122888 filed May 31, 2011, the contents of all of which are incorporated herein by reference in their entirety.

TECHNICAL FIELD

The present invention relates to a pneumatic tire formed by using a thermoplastic resin film as an inner liner.

BACKGROUND ART

As the inner liner of a pneumatic tire, a rubber layer containing a butyl rubber with a low gas permeability (high gas barrier property) as the main component is generally used. In response to the recent requirement for saving the weight of a tire, the use of a thermoplastic resin film exhibiting a lower gas permeability is proposed.

For example, Patent Document 1 describes an inner liner formed by laminating a non-vent layer formed of an ethylene-vinyl alcohol copolymer film (hereinafter sometimes referred to as "EVOH") or a polyvinylidene chloride film, both of which have an extremely low gas permeability, and an adhesive layer formed of polyethylene, polypropylene, or the like.

However, an inner liner formed of the thermoplastic resin film has little flexibility so that it cannot follow the expansion and contraction of the material while the tire runs. This may cause cracks. To solve this problem, various technologies are proposed.

For example, Patent Document 2 proposes that a thermoplastic resin film formed of a modified EVOH obtained by reacting an epoxy compound with EVOH is used for an inner liner to decrease the modulus of EVOH so as to prevent fractions and cracks when the inner liner is bent. Patent Document 3 proposes that the bonded surface of an inner liner formed of a thermoplastic resin film, which is bonded to the carcass, be subjected to surface oxidation to improve the peel strength and fracture resistance when the inner liner is bent so as to reduce the generation of cracks.

RELATED ART DOCUMENTS

Patent Documents

Patent Document 1: JP 6-040207A
Patent Document 2: JP 2004-176048A
Patent Document 3: JP 2009-255601A

DISCLOSURE OF THE INVENTION

Patent documents 2 and 3 try to improve the anti-crack property of the thermoplastic resin film from the viewpoint of modifying the thermoplastic resin film itself. To further improve the anti-crack property, the technology is required to be improved from a different viewpoint. In particular, a low-temperature environment more easily causes cracks, and thus the technology is required to be further improved to enhance the anti-crack property at a low temperature.

The present invention is accomplished under such a circumstance. An objective of the present invention is to provide a pneumatic tire formed by using a thermoplastic resin film as an inner liner, the pneumatic tire having a liner with excellent anti-crack property in a low-temperature environment.

As the result of intensive studies by the present inventors to achieve the above objective, they found that the objective could be achieved by a pneumatic tire formed by using an inner liner having a thermoplastic resin film, in which the relationship among the dynamic storage modulus E's at a low temperature of a inner liner formed by using a thermoplastic resin film, a carcass, and an adhesive layer disposed between the inner liner and the carcass is optimized.

The present invention has been achieved based on these findings.

The present invention provides the following content.

A pneumatic tire includes an inner liner having a thermoplastic resin film, a carcass, and an adhesive layer disposed between the inner liner and the carcass, in which the dynamic storage modulus E's at $-20°$ C. of the thermoplastic resin film, the adhesive layer, and the carcass are defined as $E_1'$, $E_2'$, and $E_3'$, respectively, and the relationship among $E_1'$, $E_2'$, and $E_3'$ satisfies $E_1'>E_2'>E_3'$.

The present invention can provide a pneumatic tire formed by using a thermoplastic resin film as an inner liner, the pneumatic tire exhibiting excellent anti-crack property at a low temperature.

THE MOST PREFERRED EMBODIMENT TO CARRY OUT THE INVENTION

Pneumatic Tire

The pneumatic tire of the present invention includes an inner liner having a thermoplastic resin film, a carcass, and an adhesive layer disposed between the inner liner and the carcass, in which the dynamic storage modulus E's at $-20°$ C. of the thermoplastic resin film, the adhesive layer, and the carcass are defined as $E_1'$, $E_2'$, and $E_3'$, respectively, and the relationship among $E_1'$, $E_2'$, and $E_3'$ satisfies:

$$E_1'>E_2'>E_3'$$

As described above, in the pneumatic tire of the present invention, the adhesive layer is provided between the thermoplastic resin film and the carcass, and the dynamic storage modulus $E_2'$ at $-20°$ C. of this adhesive layer is between the dynamic storage modulus $E_1'$ at $-20°$ C. of the thermoplastic resin film and the dynamic storage modulus $E_3'$ at $-20°$ C. of the carcass. This reduces the differences of dynamic storage modulus E' at a low temperature between the thermoplastic resin film and the adhesive layer and between the adhesive layer and the carcass, resulting in excellent anti-crack property in a low-temperature environment of the thermoplastic resin film.

The "dynamic storage modulus E' at $-20°$ C." is measured at $-20°$ C. with a spectrometer at an initial strain of 10%, a dynamic strain of 0.1%, and a frequency of 15 Hz, which can be measured by the method of the examples.

Structure of Pneumatic Tire

Figure 1:
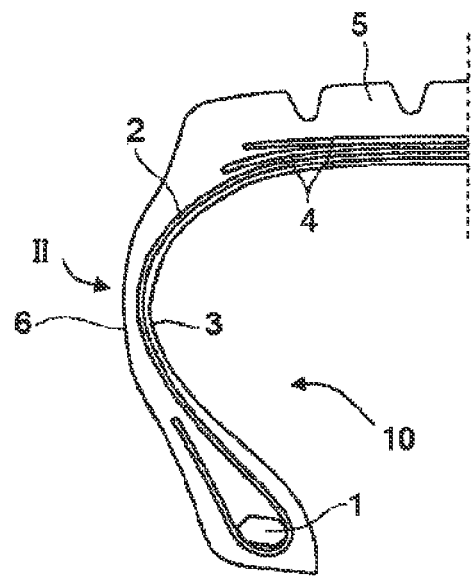
FIG. 1 shows a partial sectional view illustrating an embodiment of the pneumatic tire of the present invention.
Figure 2:
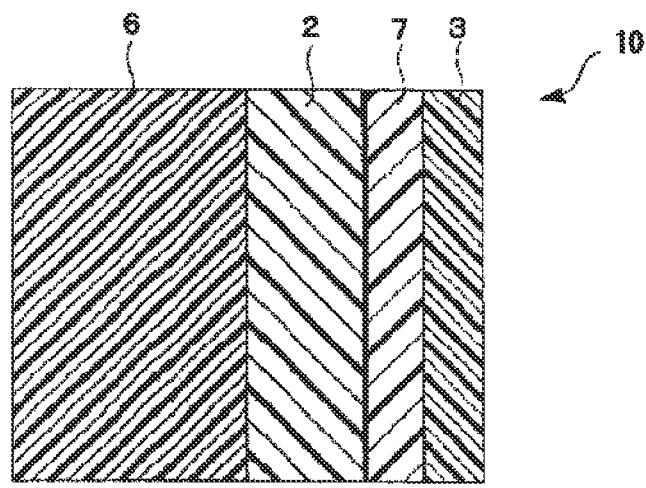
FIG. 2 shows a partially-enlarged sectional view of the part II of FIG. 1.

An embodiment of the present invention will be explained in detail below with reference to the attached drawings. FIG. 1 shows a partial sectional view of an example of a pneumatic tire 10 in the tread width direction and the radial direction, and FIG. 2 shows a partially-enlarged sectional view of the part II of FIG. 1.

This pneumatic tire 10 includes a bead core 1, a carcass 2 wound around the bead core 1, an inner liner layer 3 having a thermoplastic resin film, the inner layer being disposed on the inside of the carcass 2 in the tire radial direction, an adhesive layer 7 (not shown in FIG. 1) disposed between the carcass 2 and the inner liner 3, the adhesive layer bonding the carcass to the inner liner, a belt part having two belt layers 4 disposed on the outside of the crown part of the carcass 2 in the tire radial direction, a tread part 5 disposed on the outside of the belt part in the tire radial direction, and a side wall part 6.

In this pneumatic tire 10, the dynamic storage modulus E's at −20° C. of the thermoplastic resin film, the adhesive layer 7, and the carcass 2 are defined as $E_1'$, $E_2'$, and $E_3'$, respectively, and the relationship among $E_1'$, $E_2'$, and $E_3'$ satisfies the following expression.

$$E_1' > E_2' > E_3' \quad (1)$$

The carcass 2, the inner liner 3 having a thermoplastic resin film, and the adhesive layer 7 will be explained in detail below in this order.

Carcass 2

The carcass 2 consists of one or two more carcass plies. The carcass ply has a structure with fiber such as polyester being covered with coating rubber.

The dynamic storage modulus "$E_3'$" at −20° C. of the carcass in the above-mentioned expression (1) is the dynamic storage modulus E' of this coating rubber of the carcass.

The material of this coating rubber is not limited in particular. For example, diene rubber is used as the material. This diene rubber includes a natural rubber (NR), an isoprene synthetic rubber (IR), a cis-1,4-polybutadiene rubber (BR), a syndiotactic 1,2-polybutadiene rubber (1,2BR), and a styrene-butadiene rubber (SBR). These diene rubbers may be used alone or in combination of two or more kinds.

In the coating rubber, compounding ingredients typically used in rubber field, such as reinforcing filler, softener, antioxidant, vulcanizer, vulcanization accelerator for rubber, antiscorching agent, zinc oxide, and stearic acid can appropriately be mixed in accordance with the intended use, in addition to the above-mentioned rubber components. As these compounding ingredients, commercially available products can preferably be used.

The dynamic storage modulus $E_3'$ at −20° C. of this coating rubber is preferably $4.8 \times 10^6$ to $5.4 \times 10^7$ Pa, more preferably $7 \times 10^6$ to $3.9 \times 10^7$ Pa, further more preferably $1 \times 10^7$ to $3 \times 10^7$ Pa. The dynamic storage modulus $E_3$ of $4.8 \times 10^6$ Pa or more decreases the difference from the dynamic storage modulus $E_1'$ of the thermoplastic resin film forming the inner liner 3 leading to excellent following property of the thermoplastic resin film to the carcass 2 when the tire is bent, resulting in the improved anti-crack property in a low-temperature environment. The dynamic storage modulus $E_3'$ of $5.4 \times 10^7$ Pa or less increases the anti-crack property of the coating rubber itself.

Inner Liner 3

The inner liner 3 has a thermoplastic resin film. The dynamic storage modulus $E_1'$ at −20° C. of the thermoplastic resin film is preferably $1 \times 10^8$ to $3 \times 10^9$ Pa, more preferably $3 \times 10^8$ to $2 \times 10^9$ Pa, further more preferably $5 \times 10^8$ to $1.5 \times 10^9$ Pa. Generally, the thermoplastic resin film with a low gas permeability increases the dynamic storage modulus $E_1'$ at −20° C. Accordingly, the dynamic storage modulus $E_1'$ at −20° C. of the thermoplastic resin film of $1 \times 10^8$ Pa or more can allow the thermoplastic resin film with a low gas permeability to be used so as to improve the gas barrier property. The dynamic storage modulus $E_1'$ of $1 \times 10^9$ or less improves the elasticity in an low-temperature environment of the thermoplastic resin film and decreases the difference from the modulus in a low-temperature environment of the carcass to lead to excellent following property of the thermoplastic resin film to the carcass when the tire is bent, resulting in the improved anti-crack property in a low-temperature environment.

The difference ($E_1' - E_2'$) of dynamic storage modulus between $E_1'$ of the thermoplastic resin film (layer A) and $E_2'$ of the below-mentioned adhesive layer is preferably $2.6 \times 10^8$ to $4.3 \times 10^8$ Pa, more preferably $3.2 \times 10^8$ to $4.3 \times 10^8$ Pa, further more preferably $3.9 \times 10^8$ to $4.3 \times 10^8$ Pa. The difference ($E_1' - E_2'$) of $2.6 \times 10^8$ Pa or more can allow the thermoplastic resin film with a low gas permeability to be used so as to improve the gas barrier property. The difference ($E_1' - E_2'$) of $4.3 \times 10^8$ or less decreases the difference from the modulus in a low-temperature environment of the carcass to lead to excellent following property of the thermoplastic resin film to the adhesive layer when the tire is bent, resulting in the improved anti-crack property in a low-temperature environment.

This inner liner 3 may be formed of a single layer of thermoplastic resin film (layer A), two or more layers of thermoplastic resin films (layer A), or two or more layers in combination of a thermoplastic resin film (layer A) and another layer. The another layer is preferably a layer formed of a resin composition containing an elastomer (layer B), which has a higher extensibility than the thermoplastic resin film (layer A). This can improve the extensibility of the entire inner liner 3 even when the extensibility of the thermoplastic resin film (A layer) is low.

When the inner liner 3 is multi-layered, the dynamic storage modulus "$E_1'$" at −20° C. of the thermoplastic resin film in the above-mentioned expression (1) is the dynamic storage modulus E' of the layer on the outermost diameter side in the tire radial direction (in other words, the closest side to the carcass) of the above-mentioned thermoplastic resin film (layer A). However, the dynamic storage modulus E' of all the layers A of the inner liner 3 preferably falls within the above-mentioned range of $E_1'$.

The layer structure (multi-layered laminate) when the inner liner 3 is multi-layered, the thermoplastic resin film (layer A), the layer formed of a resin composition containing an elastomer (layer B), the relationship between the layers A and B, and the method of preparing the multi-layered laminate will be explained below in this order.

Layer Structure (Multi-Layered Laminate)

The multi-layered laminate is preferably provided with two or more layers in total: at least one thermoplastic resin film (layer A) and at least one layer formed of a resin composition containing an elastomer (layer B). Accordingly, the multi-layered laminate has the layer A with low-gas permeability and the layer B with a high extensibility to lead to low-gas permeability and excellent anti-crack property in the low-temperature environment of the entire inner liner 3.

From this viewpoint and the viewpoint of the preparation, the total number of the layers A and B is more preferably 5 or more, more preferably 21 or more, particularly preferably 25 or more, further particularly preferably 48 or more, and extremely preferably 65 or more. The multi-layered laminate may have even more layers. Thus, the total number of the layers A and B can be 128 or more, 256 or more, 512 or more, or 1,024 or more. The upper limit of the total number of the layers is appropriately selected depending on the application of the multi-layered laminate.

This multi-layered laminate can have a layer C and the like other than the layers A and B. The order of laminating the layers A and B can be, for example,
(1) A, B, A, B . . . A, B (i.e., $(AB)_n$)
(2) A, B, A, B . . . A (i.e., $(AB)_nA$)
(3) B, A, B, A . . . B (i.e., $(BA)_nB$)
(4) A, A, B, B . . . B, B (i.e., $(AABB)_n$), or the like. Moreover, when the multi-layered laminate has additional layers C, the order of laminating the layers can be,
(5) A, B, C . . . A, B, C (i.e., $(ABC)_n$) or the like. In the above-mentioned (1)-(5), n is an integer of 1 or more.

Particularly, the layers A and B are preferably laminated alternatively as the above-mentioned laminating order (1), (2), or (3). This multi-layered laminate with the layers A and B being alternately laminated may be irradiated with active energy rays. This can improve the binding property between laminated layers to exhibit a high adhesion. As a result, the interlayer adhesion and thus the low-gas permeability, the bending resistance, and the like of the multi-layered laminate can be greatly improved. Moreover, in the structure with the layers A and B being alternatively laminated, a layer A is placed between layers B to further improve the extensibility of the layer A.

In this multi-layered laminate, the average thickness of the above-mentioned layers A and B is preferably 0.001 to 10 µm, more preferably 0.001 to 40 µm. The average thickness of the layers A and B falling within the above-mentioned range can increase the number of layers without changing the thickness of the entire multi-layered laminate. As a result, the low-gas permeability, the bending resistance, and the like of the multi-layered laminate can be further improved.

Since in the multi-layered laminate, a layer A with a thickness falling within the above-mentioned range and a layer B formed of a resin composition containing an elastomer are laminated, the extensibility of the layer A formed of a resin composition with a low extensibility can be further improved even when the extensibility of the gas barrier resin is low. This is because the layer A formed of a resin composition with low extensibility being thinly laminated on the layer B with excellent extensibility may allow the extensibility of the resin composition to transit from low to high. The present inventors pay attention to the above-mentioned fact. Although the layer A is generally formed of a material with a low general extensibility, extremely reducing the thickness of each layer can highly exert low-gas permeability and the bending resistance required for the inner liner. Therefore, the multi-layered laminate can maintain the properties including the low-gas permeability even when deformed, for example, bended.

The lower limit of the average thickness of the layer A is preferably 0.001 µm, more preferably 0.005 µm, further more preferably 0.01 µm. On the other hand, the upper limit of the average thickness of the layer A is preferably 10 µm, more preferably 7 µm, further more preferably 5 µm, further more preferably 3 µm, further more preferably 1 µm, further more preferably 0.5 µm, further more preferably 0.2 µm, particularly preferably 0.1 µm, most preferably 0.05 µm.

If the average thickness of the layer A is smaller than the above-mentioned lower limit, the layer A is hardly formed in a uniform thickness. This may decrease the low-gas permeability and the bending resistance of the multi-layered laminate. On the other hand, if the average thickness of the layer A is larger than the above-mentioned upper limit, the durability and the anti-crack property of the multi-layered laminate may decrease when the thickness of the entire multi-layered laminate is not changed. Moreover, if the average thickness of the layer A is larger than the above-mentioned upper limit, the extensibility of the layer A as described above may not be sufficiently improved. The average thickness of the layer A is referred to as a value determined by dividing the total thickness of all the layers A contained in the multi-layered laminate by the number of the layers A.

The lower limit of the average thickness of the layer B is preferably 0.001 µm, more preferably 0.005 µm, further more preferably 0.01 µm for the same reason as that for the layer A. The upper limit of the average thickness of the layer B is preferably 40 µm, more preferably 30 µm or less, further more preferably 20 µm or less. On the other hand, if the average thickness of the layer B is larger than the above-mentioned upper limit, the durability and the anti-crack property of the multi-layered laminate may decrease when the thickness of the entire multi-layered laminate is not changed. The average thickness of the layer B is referred to as a value determined by dividing the total thickness of all the layers B contained in the multi-layered laminate by the number of the layers B.

The ratio (layer B/layer A) of the average thickness of the layer B to that of a layer A is preferably ⅓ or more, more preferably ½ or more. Further more preferably, the above-mentioned ratio is 1 or more. In other words, the average thickness of the layer B is the same as or more than that of a layer A. The ratio is particularly preferably 2 or more. This ratio improves the bending fatigue resistance to fractures of all the layers of the multi-layered laminate.

The thickness of the multi-layered laminate is preferably 0.1 µm or more and 1,000 µm or less, more preferably 0.5 µm or more and 750 µm or less, further more preferably 1 µm or more and 500 µm or less. The thickness of the multi-layered laminate falling within the above-mentioned range in combination with the average thickness of the layers A and B falling within the above-mentioned can maintain the applicability to the inner liner and the like of a pneumatic tire and further improve the gas barrier property, the bending resistance, the anti-crack property, the durability, the extensibility, and the like. The thickness of the multi-layered laminate is determined by measuring the thickness of the cross section at an arbitrarily-selected point of the multi-layered laminate.

Thermoplastic Resin Film (Layer A)

The thermoplastic resin film (layer A) may at least contain a layer formed of a resin composition (A3) in which a flexible resin (A2) with a dynamic storage modulus E' at −20° C. lower than that of the thermoplastic resin (A1) is dispersed in a matrix formed of a thermoplastic resin (A1).

The thermoplastic resin (A1) preferably has a dynamic storage modulus E' at −20° C. of more than $1\times10^8$ Pa, specifically including a polyamide resin, a polyvinylidene chloride resin, a polyester resin, a thermoplastic urethane elastomer, and an ethylene-vinyl alcohol copolymer resin. Among these, an ethylene-vinyl alcohol copolymer resin is preferable. The ethylene-vinyl alcohol copolymer resin has low air permeability and very excellent low-gas permeability. These thermoplastic resins (A1) may be used alone or in combination of two or more kinds.

On the other hand, the flexible resin (A2) is required to have a dynamic storage modulus E' at −20° C. lower than that of the above-mentioned thermoplastic resin (A1), which is preferably $1\times10^8$ Pa or less. The dynamic storage modulus E' of $1\times10^8$ Pa or less can decrease the modulus of the thermoplastic resin film (layer A) so as to improve the anti-crack property and the bending resistance in the low-temperature environment.

Moreover, the above-mentioned flexible resin (A2) preferably has a functional group reacting with a hydroxyl group. This uniformly disperses the flexible resin (A2) in a thermoplastic resin (A1). The functional group reacting with a hydroxyl group includes a maleic anhydride residue, a hydroxyl group, a carboxyl group, and an amino group. This flexible resin (A2) with a functional group reacting with a hydroxyl group specifically includes a maleic anhydride-modified hydrogenated styrene-ethylene-butadiene-styrene block copolymer and a maleic anhydride-modified ultralow-density polyethylene.

The above-mentioned flexible resin (A2) preferably has an average particle size of 2 μm or less. The average particle size of the flexible resin (A2) of 2 μm or less can sufficiently improve the bending resistance of the thermoplastic resin film (layer A) to increase the gas barrier property and thus the internal pressure retention of a tire. The average particle size of the flexible resin (A2) in the thermoplastic resin film (layer A) is observed with a transmission electron microscope (TEM), for example, after the sample is frozen and cut out into a section by using a mikrotom.

The content of the flexible resin (A2) in the thermoplastic resin film (layer A) preferably falls within the range of 10 to 30% by mass. The content of the flexible resin (A2) is 10% by mass or more has a profound effect on the improvement of the bending resistance. On the other hand, the content of the flexible resin (A2) is 30% by mass or less can suppress the gas permeability.

The above-mentioned ethylene-vinyl alcohol copolymer resin is preferably a modified ethylene-vinyl alcohol copolymer obtained, for example, by reacting an epoxy compound with an ethylene-vinyl alcohol copolymer. This modified ethylene-vinyl alcohol copolymer has a lower modulus than a typical ethylene-vinyl alcohol copolymer so as to have high fracture resistance when the layer is bent and excellent anti-crack property in the low-temperature environment.

The above-mentioned ethylene-vinyl alcohol copolymer contains ethylene in a content of preferably 25 to 50% by mole, more preferably 30 to 48% by mole, further more preferably 35 to 45% by mole. The content of ethylene of 25% by mole or more provides excellent bending resistance, fatigue resistance, and melt molding property. On the other hand, the content of ethylene of 50% by mole or less can sufficiently secure the gas barrier property. The ethylene-vinyl alcohol copolymer also has a saponification degree of preferably 90% or more, more preferably 95% or more, further more preferably 99% or more. The saponification degree is 90% or more achieve the gas barrier property and the heat stability during molding sufficiently. The ethylene-vinyl alcohol copolymer also has a melt flow rate (MFR) of preferably 0.1 to 30 g/10 minutes, more preferably 0.3 to 25 g/10 minutes at 190° C. under a load of 2160 g.

In the present invention, the method of preparing a modified ethylene-vinyl alcohol copolymer is not limited in particular, preferably including reacting an ethylene-vinyl alcohol copolymer with an epoxy compound in a solution. More specifically, a modified ethylene-vinyl alcohol copolymer can be prepared by adding and reacting an epoxy compound in an ethylene-vinyl alcohol copolymer solution in the presence of an acid catalyst or an alkali catalyst, preferably an acid catalyst. The solvent includes an aprotic polar solvent such as dimethyl sulfoxide, dimethyl formamide, dimethyl acetamide, and N-methylpyrrolidone. The acid catalyst includes p-toluenesulfonic acid, methanesulfonic acid, trifluoromethanesulfonic acid, sulfuric acid, and boron trifluoride. The alkali catalyst includes sodium hydroxide, potassium hydroxide, lithium hydroxide, and sodium methoxide. The amount of the catalyst preferably falls within the range of about 0.0001 to 10 parts by mass based on 100 parts by mass of the ethylene-vinyl alcohol copolymer.

The epoxy compound to be reacted with the above-mentioned ethylene-vinyl alcohol copolymer is preferably a monovalent epoxy compound. A divalent or polyvalent epoxy compound is cross-linked to an ethylene-vinyl alcohol copolymer to generate gel and particles, which may deteriorate the crystalline quality of the inner liner. From the viewpoint of the easiness of preparation, the gas barrier property, the bending resistance, and the fatigue resistance of the modified ethylene-vinyl alcohol copolymer, glycidol and epoxypropane are particularly preferable among monovalent epoxy compounds. The above-mentioned epoxidized compound is reacted in a content of preferably 1 to 50 parts by mass, more preferably 2 to 40 parts by mass, further more preferably 5 to 35 parts by mass based on 100 parts by mass of the ethylene-vinyl alcohol copolymer.

The above-mentioned modified ethylene-vinyl alcohol copolymer has a melt flow rate (MFR) of preferably 0.1 to 30 g/10 minutes, more preferably 0.3 to 25 g/10 minutes, further more preferably 0.5 to 20 g/10 minutes at 190° C. under a load of 2160 g from the viewpoint of obtaining gas barrier property, bending resistance, and fatigue resistance.

The above-mentioned thermoplastic resin film (layer A) can be formed into a film, a sheet, or the like by extrusion such as a melt molding process, preferably a T-die process or an inflation process, preferably at a melting temperature of preferably 150 to 270° C., after the resin composition (A3) is prepared by mixing the thermoplastic resin (A1) with the flexible resin (A2). The above-mentioned thermoplastic resin film (layer A) may be single- or multi-layered as long as containing a layer formed of the resin composition (A3). The multi-layering method includes coextrusion.

The laminate in the present invention preferably contains at least one or more layers formed of a thermoplastic urethane elastomer from the viewpoint of the water resistance and the adhesion to rubber. The above-mentioned thermoplastic urethane elastomer is obtained by reacting a polyol, an isocyanate compound, and a short chain diol. The polyol and the short chain diol form linear polyurethane by the addition reaction with an isocyanate compound. The above-mentioned polyol forms the soft segment of the thermoplastic polyurethane elastomer, and the diisocyanate and the diol form the hard segment. The thermoplastic urethane elastomer can widely change its properties by changing the types, the mixing amounts, the polymerization conditions, and the like of the raw materials. This thermoplastic urethane elastomer preferably includes a polyether urethane.

The above-mentioned thermoplastic resin film (layer A) has an oxygen permeation coefficient at 20° C. and 65% RH of preferably $3.0 \times 10^{-12}$ cm$^3$/cm$^2$·sec·cmHg or less, more preferably $1.0 \times 10^{-12}$ cm$^3$/cm$^2$·sec·cmHg or less, further more preferably $5.0 \times 10^{-13}$ cm$^3$/cm$^2$·sec·cmHg or less. The oxygen permeation coefficient at 20° C. and 65% RH of $3.0 \times 10^{-12}$ cm$^3$/cm$^2$·sec·cmHg or less can improve the internal pressure retention of a tire by using the thermoplastic resin film (layer A) as the inner line so as to sufficiently decrease the weight of the tire.

Furthermore, the above-mentioned thermoplastic resin film (layer A) is preferably cross-linked. The cross-linking of the thermoplastic resin film (layer A) prevents the laminate (inner liner) to be severely deformed and thus ununiformed during the tire vulcanization step to sufficiently maintain the gas barrier property, the bending resistance, and the fatigue resistance of the thermoplastic resin film (layer A). The cross-linking method preferably includes irradiating energy rays. The energy rays include ionizing radiations such as ultraviolet rays, electron beams, X-rays, $\alpha$-rays, and $\gamma$-rays. Among these, electron beams are particularly preferable. The irradiation of electron beams is preferably conducted after the thermoplastic resin film (layer A) is processed into a molded article such as a film or a sheet. The dose of electron beams preferably falls within the range of 10 to 60 Mrad, more preferably 20 to 50 Mrad. The dose of electron beams of 10 Mrad or more sufficiently promotes the cross-linking. On the other hand, the dose of electron beams of 60 Mrad or less hardly degrades the molded article. Moreover, the thermoplastic resin film (layer A) may be subjected to a surface treatment by the oxidation process, the roughening process, or the like to improve the tackiness to the adhesive layer. The oxidation process includes corona discharge treatment, plasma discharge treatment, chromic acid treatment (wet treatment), flame treatment, heated air treatment, ozone treatment, and ultraviolet ray radiation treatment. The roughening process includes sand blasting treatment and solvent treatment. Among these, corona discharge treatment is preferable.

Layer Formed of Resin Composition Containing Elastomer (Layer B)

The inner liner formed of the above-mentioned multi-layered laminate preferably contains at least one or more layers formed of a resin composition containing an elastomer (layer B) from the viewpoint of the water resistance and the adhesion to rubber. As the elastomer, a thermoplastic elastomer is preferably used for the melt molding process.

This thermoplastic elastomer can include at least one kind selected from a group consisting of, for example, a thermoplastic polystyrene elastomer, a thermoplastic polyolefin elastomer, a thermoplastic polydiene elastomer, a thermoplastic polyvinyl chloride elastomer, a thermoplastic chlorinated-polyethylene elastomer, a thermoplastic polyurethane elastomer (hereinafter referred to as "TPU"), a thermoplastic polyester elastomer, a thermoplastic polyamide elastomer, and a thermoplastic fluorine resin elastomer. Among these, from the viewpoint of the easy molding, at least one kind selected from a group consisting of a thermoplastic polystyrene elastomer, a thermoplastic polyolefin elastomer, a thermoplastic polydiene elastomer, a thermoplastic polyurethane elastomer, a thermoplastic polyester elastomer, and a thermoplastic polyamide elastomer is preferably used, and a thermoplastic polyurethane elastomer is more preferably used.

The above-mentioned thermoplastic polyurethane elastomer is obtained by reacting a polyol, an isocyanate compound, and a short chain diol. The polyol and the short chain diol form linear polyurethane by the addition reaction with an isocyanate compound. The above-mentioned polyol forms the soft segment of the thermoplastic polyurethane elastomer, and the diisocyanate and the diol form the hard segment. The thermoplastic urethane elastomer can widely change its properties by changing the types, the mixing amounts, the polymerization conditions, and the like of the raw materials. This thermoplastic urethane elastomer preferably includes a polyether urethane.

Relationship Between Layers A and B

In the above-mentioned multi-layered laminate, the peel strength between the layer A and B is preferably 25 N/25 mm or more, and thus the layers A and B have very excellent interlayer adhesion. This peel strength is more preferably 27 N/25 mm or more, further more preferably 30 N/25 mm or more, particularly preferably 50 N/25 mm or more.

The peel strength can be measured at a tension rate of 50 mm/minute under 23° C. and 50% RH atmosphere in accordance with JIS-K6854 after the laminate is heated at 180° C. for 15 minutes.

Regarding the interlayer relationship of the multi-layered laminate, crosslinking reaction between molecules occurs at the interface of the layers A and B by irradiating active energy rays. Thus, molecules at the interface may be strongly bonded to provide a high interlayer adhesion.

As the combination of the layers A and B, preferably, the layer A includes one kind or two or more kinds of a polyamide resin, a polyvinylidene chloride resin, a polyester resin, a thermoplastic urethane elastomer, and an ethylene-vinyl alcohol copolymer resin; and the layer B includes one kind or two or more kinds of a thermoplastic polystyrene elastomer, a thermoplastic polyolefin elastomer, a thermoplastic polydiene elastomer, a thermoplastic polyvinyl chloride elastomer, a thermoplastic chlorinated-polyethylene elastomer, a thermoplastic polyurethane elastomer, a thermoplastic polyester elastomer, a thermoplastic polyamide elastomer, and a thermoplastic fluorine resin elastomer.

As the combination of the layers A and B, more preferably, the layer A includes an ethylene-vinyl alcohol copolymer resin; and the layer B includes one kind or two or more kinds of a thermoplastic polystyrene elastomer, a thermoplastic polyolefin elastomer, a thermoplastic polydiene elastomer, a thermoplastic polyvinyl chloride elastomer, a thermoplastic chlorinated-polyethylene elastomer, a thermoplastic polyurethane elastomer, a thermoplastic polyester elastomer, a thermoplastic polyamide elastomer, and a thermoplastic fluorine resin elastomer.

As the combination of the layers A and B, more preferably, the layer A includes one kind or two or more kinds of a polyamide resin, a polyvinylidene chloride resin, a polyester resin, a thermoplastic urethane elastomer, and an ethylene-vinyl alcohol copolymer resin; and the layer B includes a thermoplastic polyurethane elastomer.

As the combination of the layers A and B, further more preferably, the layer A includes an ethylene-vinyl alcohol copolymer resin; and the layer B includes a thermoplastic polyurethane elastomer.

Method of Preparing Multi-Layered Laminate

The method of preparing the multi-layered laminate is not limited in particular as long as the layers A and B are well laminated and bonded. As the method, a well-known method such as coextrusion, adhesion, attachment, coating, bonding, and deposition can be used. The method of preparing the multi-layered laminate includes, specifically, (1) using a resin composition for forming the layer A and a resin composition for forming the layer B to prepare a multi-layered laminate having the layers A and B by multi-layer coextrusion or (2) using a resin composition for forming the layer A and a resin composition for forming the layer B, overlaying a plurality of layers through an adhesive, and drawing the overlaid layers to prepare a multi-layered laminate having the layers A and B. Among these, from the viewpoint of the high productivity, the excellent interlayer adhesion, the method preferably includes (1) using a resin composition for forming the layer A and a resin composition for forming the layer B to prepare a multi-layered laminate having the layers A and B by multi-layer coextrusion.

In the multi-layer coextrusion, a resin composition for forming the layer A and a resin composition for forming the layer B are melted on heating, supplied from their respective extruder devices or pumps to an extrusion die through their respective flow paths, extruded from the extrusion die into layers. Then, the layers are laminated and bonded to form the multi-layered laminate. As this extrusion die, for example, a multi-manifold die, a field block, a static mixer, and the like can be used.

The multi-layered structure thus obtained is preferably irradiated with active energy rays as described above to promote crosslinking reaction so as to improve the interlayer adhesion between the layers A and B. The multi-layered laminate formed by irradiating active energy rays can improve the gas barrier property and the bending resistance as a result of the increased interlayer adhesion.

The above-mentioned active energy rays have energy quantum in electromagnetic radiation or charged particle radiation, which are specifically ultraviolet rays, γ rays, and electron beams. Among these active energy rays, electron beams are preferable from the viewpoint of the effect on the improvement of the interlayer adhesion. The use of electron beams as the active energy rays further promotes the crosslinking reaction between the layers so that the interlayer adhesion of the multi-layered laminate can be further improved.

When electron beams are irradiated, various electron beam accelerators such as a Cockcroft-Walton accelerator, a Van de Graft accelerator, a resonance transformer accelerator, an insulated core transformer accelerator, a linear accelerator, a dynamitron accelerator, a radio-frequency accelerator are used as the electron beam source. The electron beams should typically be irradiated at an acceleration volt of 100 to 500 kV and an irradiation dose of 5 to 600 kGy.

When ultraviolet rays are used as active energy rays, ultraviolet rays with a wavelength 190 to 380 nm should be irradiated. As the ultraviolet ray source, for example, a high-pressure mercury lamp, a low-pressure mercury lamp, a metal halide lamp, a carbon-arc lamp, and the like are used without any limitations.

This multi-layered laminate has excellent interlayer adhesion, high gas barrier property, high extensibility, high thermoformability, and high durability as described above.

This multi-layered laminate is not limited to the above-mentioned embodiment. For example, it may include layers other than the layers A and B. The types of the resin compositions forming these other layers are not limited in particular but preferably have high adhesion between the layers A and/or B. The other layers particularly preferably have a molecular chain with a functional group forming a bond by reacting with, for example, the hydroxyl group of an EVOH in the layer A or the carbamate group or the isocyanate group of the molecular chain of TPU in the layer B.

Adhesive Layer

The dynamic storage modulus $E_2'$ at −20° C. of the adhesive layer 7 should have the relationship of the above-mentioned expression (1).

In particular, $E_2'$ of this adhesive layer 7 is closer to $E_1'$ than a value intermediate between $E_3'$ of the carcass and $E_1'$ of the thermoplastic resin film (($E_1'-E_2'$)/2) to lead to excellent following property of the thermoplastic resin film to the adhesive layer 7, resulting in the improved anti-crack property in a low-temperature environment. If $E_2'$ is close to $E_1'$ of the thermoplastic resin film too much, the following property of the adhesive layer 7 to the carcass 2 deteriorates, resulting in the decreased anti-crack property in a low-temperature environment. From this viewpoint, in the expression:

$$\Delta E' = (E_2'-E_3')/(E_1'-E_3'),$$

the value of $\Delta E'$ is preferably more than 0.5 and less than 1, more preferably 0.5 to 0.8, further more preferably 0.5 to 0.6.

The difference ($E_1'-E_2'$) of dynamic storage modulus between $E_1'$ of the above-mentioned thermoplastic resin film and $E_2'$ of this adhesive layer 7 is preferably $2.6\times10^8$ to $4.3\times10^8$ Pa, more preferably $3.2\times10^8$ to $4.3\times10^8$ Pa, further more preferably $3.9\times10^8$ to $4.3\times10^8$ Pa. The difference ($E_1'-E_2'$) of $2.6\times10^8$ Pa or more can allow the thermoplastic resin film with a low gas permeability to be used so as to improve the gas barrier property. The difference ($E_1'-E_2'$) of $4.3\times10^8$ Pa or less is small enough to improve the anti-crack property in the low temperature environment.

The difference ($E_2'-E_3'$) of dynamic storage modulus between $E_2'$ of this adhesive layer 7 and $E_3'$ of the above-mentioned carcass 2 is preferably $9.3\times10^7$ to $3.1\times10^8$ Pa, more preferably $9.3\times10^7$ to $2.4\times10^8$ Pa, further more preferably $9.3\times10^7$ to $1.8\times10^8$ Pa. The difference ($E_2'-E_3'$) of dynamic storage modulus of $9.3\times10^7$ Pa or more can bring $E_2'$ of the adhesive layer 7 close to $E_1'$ of the thermoplastic resin film (layer A) to prevent cracks from being caused between the thermoplastic resin film (layer A) and the adhesive layer 7. The difference ($E_2'-E_3'$) of $3.1\times10^8$ Pa or less decreases the difference between $E_2'$ of the adhesive layer and $E_3'$ of the carcass 2 to improve the anti-crack property in the low temperature environment.

The dynamic storage modulus $E_2'$ at −20° C. of this adhesive layer 7 is preferably $3\times10^7$ to $5.3\times10^8$ Pa, more preferably $4\times10^7$ to $4.6\times10^8$ Pa, further more preferably $5\times10^7$ to $3.7\times10^8$ Pa. The dynamic storage modulus $E_2'$ of $3\times10^7$ Pa or more preferably increases the gas barrier property of the adhesive layer itself. The dynamic storage modulus $E_2'$ of $5.3\times10^8$ or less improves the elasticity of the adhesive layer 7 and thus the anti-crack property in the low-temperature environment.

The material of this adhesive layer is not limited in particular as long as having the characteristics of the above-mentioned dynamic storage modulus $E_2'$ at −20° C. and enabling the inner liner to bond to the carcass, preferably containing a diene polymer modified with a polar functional group (modified diene polymer).

The above-mentioned polar functional group includes an epoxy group, an amino group, an imino group, a nitrile group, an ammonium group, an isocyanate group, an imide group, an amide group, a hydrazo group, an azo group, a diazo group, a hydroxyl group, a carboxyl group, a carbonyl group, an oxycarbonyl group, a sulfide group, a disulphide group, a sulphonyl group, a sulfinyl group, a thiocarbonyl group, a nitrogenated heterocycle group, an oxygenated heterocyclic group, an alkoxysilyl group, and a tin-containing group. Particularly, an epoxy group is preferable.

The material of this adhesive layer preferably contains a softener described later. By adjusting the content of this softener in the adhesive layer, the dynamic storage modulus $E_2'$ at −20° C. of this rubber layer 7 can also be adjusted.

Modified Diene Polymer

The modified diene polymer includes modified natural rubbers and/or modified synthetic rubbers. The modified synthetic rubbers include a modified polyisoprene rubber (IR), a modified polybutadiene rubber (BR), a modified styrene-butadiene copolymer (SBR), and a modified styrene isoprene copolymer (SIR). These modified natural rubbers and modified synthetic rubbers have excellent durability in the low-temperature environment.

The adhesive layer preferably contains two or more kinds of the above-mentioned modified diene polymers with different modification rates. Thus, the modified diene polymer with a low modification degree can improve the adhesion to the carcass, and the modified diene polymer with a high modification rate can improve the adhesion to the thermoplastic resin film.

In the present invention, the term "modification rate" means the rate (% by mole) of the number of modified double bonds to that of all the double bonds of a diene polymer before the modification.

The glass transition temperature (Tg) of this modified diene polymer is preferably 0° C. or less, more preferably −20° C. or less, further more preferably −25° C. or less, yet further more preferably −30° C. or less, yet further more preferably −40° C. or less, yet further more preferably −45° C. or less, particularly −50° C. or less. The glass transition temperature (Tg) of 0° C. or less can sufficiently decrease the brittle temperature so as to sufficiently secure the low-temperature endurance.

This glass transition temperature (Tg) is measured in the following way. The modified diene polymer is measured while the temperature is increased at 15° C./minute after cooled to −150° C. with a differential scanning calorimeter (DSC) "RDC220" available from SEIKO. The tangents to the baseline are drawn before and after a peak in the DSC curve. The temperature of the middle point between two tangents is read and defined as Tg.

Epoxidized Natural Rubber (ENR)

As the above-mentioned modified diene polymer, an epoxidized natural rubber (hereinafter sometimes abbreviated to as "ENR") is more preferably used. As the epoxidized natural rubber (ENR), a commercially available epoxidized natural rubber may be used, or a natural rubber may be epoxidized and then used. The method of epoxidizing a natural rubber is not limited in particular, including a chlorohydrin method, a direct oxidation method, a hydrogen peroxide method, an alkylhydroperoxide method, and a peracid method. The peracid method includes, for example, reacting organic peracids such as peracetic acid and performic acid with a natural rubber. Through this reaction, double bonds in a natural rubber molecule are epoxidized. The structure of the epoxidized double bonds is clarified by proton nuclear magnetic resonance spectrum (NMR) and infrared absorption spectrum (IR). The content of the epoxy group is also measured by IR and elementary analysis.

This epoxidized natural rubber is likely to have low air permeability and significantly decrease the air permeability rate, compared with a natural rubber.

This epoxidized natural rubber (ENR) preferably contains at least two kinds of ENRs with different epoxidation rates. Thus, when the resin film layer is bonded to the rubber-like elastomer layer, an ENR with a low epoxidation degree and an ENR with a high epoxidation degree can improve the adhesion to the rubber-like elastomer layer and the adhesion to the resin film layer, respectively.

The term "epoxidation rate: A % by mole" herein means that A % of the double bonds in a natural rubber are epoxidized.

In the present invention, the epoxidation rate means the rate (% by mole) of the number of epoxidized double bonds to that of all the double bonds in a rubber before epoxidation and can be measured in the following way, for example. An ENR is dissolved in deuterated chloroform. The rate h(ppm) of integrated value of the carbon-carbon double bond moiety to that of the aliphatic moiety is determined by nuclear magnetic resonance (NMR (JNM-ECA series available from JEOL Ltd.)) spectrochemical analysis. Then, the epoxidation rate can be calculated by using the following expression.

Epoxidation rate=3×h(2.69)/(3×h(2.69)+3×h(5.14)+h(0.87))×100

The ENRs with different epoxidation rates are preferably a combination of least two kinds of ENRs: (a) an ENR with an epoxidation rate of 5 to 30% by mole and (b) an ENR with an epoxidation rate of 40 to 90% by mole. The content of the above-mentioned combination of ENRs in the adhesive layer is preferably 80 to 100% by mass. The content of ENRs falling within the range of 80 to 100% by mass improves the compatibility of the components in the adhesive layer to improve the adhesivity and the durability of the adhesive layer. From such viewpoints, the content of the above-mentioned combination of ENRs is more preferably 90 to 100% by mass, most preferably 100% by mass.

The use of an ENR with an epoxidation rate of 5 to 30% by mole as the ENR with a low epoxidation rate can maintain the properties of the natural rubber, suppress the increase in the dynamic storage modulus $E_2'$ at −20° C. of the adhesive layer 7, and prevent cracks from being caused in the low-temperature environment. The use of an ENR with an epoxidation rate of 40 to 90% by mole as the ENR with a high epoxidation rate can take advantage of the properties of ENR, act with functional groups in the thermoplastic resin film, and improve the gas barrier property of the obtained laminate.

In the present invention, the content ratio of the ENR with a low epoxidation rate and the ENR with a high epoxidation rate preferably falls within the range of 20:80 to 80:20 in mass ratio from the viewpoint of the balance of the above-mentioned respective effects.

Epoxidized Butadiene Rubber (EBR)

As the above-mentioned modified diene polymer, an epoxidized butadiene rubber (hereinafter sometimes abbreviated to as "EBR") is more preferably used. The epoxidized butadiene rubber (EBR) is not limited in particular. As the EBR, a commercially available epoxidized butadiene rubber may be used, or a butadiene rubber (BR) may be epoxidized and then used. The method of epoxidizing a butadiene rubber is not limited in particular, including a chlorohydrin method, a direct oxidation method, a hydrogen peroxide method, an alkylhydroperoxide method, and a peracid method. The peracid method includes, for example, reacting organic peracids such as peracetic acid and performic acid with a butadiene rubber. Through this reaction, double bonds in a butadiene rubber molecule are epoxidized. The structure of the epoxidized double bonds is clarified by proton nuclear magnetic resonance spectrum (NMR) and infrared absorption spectrum (IR). The content of the epoxy group is also measured by IR and elementary analysis. By adjusting the amount of the organic peracid and the reaction time, the epoxidized butadiene rubber with various epoxidation rates can be prepared.

This epoxidized butadiene rubber is likely to have low air permeability and significantly decrease the air permeability rate, compared with a butadiene rubber.

The epoxidation rate of the epoxidized BR (EBR) is preferably 5% by mole or more, more preferably 10% by mole or more. The epoxidation rate of 5% by mole or more obtains sufficient adhesivity to the thermoplastic resin film. The epoxidation rate is preferably 90% by mole or less, more preferably 75% by mole or less, further more preferably 60% by mole or less. The epoxidation rate of 90% by mole or less decreases the modulus of elasticity at −20° C. to improve the low-temperature crack property.

The epoxidized BR (EBR) is not limited in particular. For example, as the EBR, BRs with a high cis content such as BR1220 available from ZEON CORPORATION and BR130B and BR150B available from UBE INDUSTRIES LTD., and BRs containing a syndiotactic polybutadiene crystal such as VCR412 and VCR617 available from UBE INDUSTRIES LTD., and the like can be used.

This epoxidized butadiene rubber (EBR) preferably contains at least two kinds of EBRs with different epoxidation rates. Thus, when the resin film layer is bonded to the rubber-like elastomer layer, an EBR with a low epoxidation degree and an EBR with a high epoxidation degree can improve the adhesion to the rubber-like elastomer layer and the adhesion to the resin film layer, respectively.

The EBRs with different epoxidation rates are preferably a combination of least two kinds of EBRs: (a) an EBR with an epoxidation rate of 5 to 30% by mole and (b) an EBR with an epoxidation rate of 40 to 90% by mole. The content of the above-mentioned combination of EBRs in the adhesive layer is preferably 80 to 100% by mass. The content of EBRs falling within the range of 80 to 100% by mass improves the compatibility of the components in the adhesive layer to improve the adhesivity and the durability of the adhesive layer. From such viewpoints, the content of the above-mentioned combination of EBRs is more preferably 90 to 100% by mass, most preferably 100% by mass.

The use of an EBR with an epoxidation rate of 5 to 30% by mole as the EBR with a low epoxidation rate (a) can maintain the properties of the butadiene rubber, suppress the increase in the dynamic storage modulus $E_2'$ at −20° C. of the adhesive layer 7, and prevent cracks from being caused in the low-temperature environment. The use of an EBR with an epoxidation rate of 40 to 90% by mole as the EBR with a high epoxidation rate (b) can take advantage of the properties of EBR, act with functional groups in the thermoplastic resin film, and improve the gas barrier property of the obtained laminate.

In the present invention, the content ratio of the EBR with a low epoxidation rate and the EBR with a high epoxidation rate preferably falls within the range of 20:80 to 80:20 in mass ratio from the viewpoint of the balance of the above-mentioned respective effects.

High Diene Elastomer

The modified diene polymer can contain a high diene elastomer in a content of preferably 20% by mass or less, more preferably 10% by mass or less but most preferably contains no high diene elastomers in addition to the above-mentioned ENR.

The high diene elastomer includes, for example, a natural rubber, a synthetic isoprene synthetic rubber (IR), a cis-1, 4-polybutadiene rubber (BR), a syndiotactic 1,2-polybutadiene rubber (1,2BR), a styrene-butadiene rubber (SBR), an acrylonitrile-butadiene rubber (NBR), and a chloroprene rubber (CR).

These high diene rubbers may be used alone or in combination of two or more kinds. Among these, a natural rubber, a synthetic isoprene synthetic rubber (IR), and a cis-1,4-polybutadiene rubber (BR) are preferable.

Softener

To adjust the dynamic storage modulus $E_2'$ at −20° C. of the adhesive layer 7, a softener is preferably contained. When the modification degree of a diene polymer is increased in order to improve the adhesion of the adhesive layer, the dynamic storage modulus $E_2'$ is likely to increase. However, the dynamic storage modulus $E_2'$ can be decreased to a desired value by adding a softener.

As the softener, any of a mineral oil softener, a vegetable oil softener, and a synthetic softener can be used. The mineral oil softener includes a petroleum softener and a coal tar softener. The petroleum softener includes processing oil, extender oil, asphalt, paraffin, liquid paraffin, vaseline, and petroleum resin. The coal tar softener includes coal tar and coumarone-indene resin.

The vegetable oil softener includes fatty oil softeners such as soybean oil, palm oil, pine oil, castor oil, flaxseed oil, rapeseed oil, coconut oil, and tall oil; waxes such as factice, bees wax, carnauba wax, and lanolin; and aliphatic acids such as linolic acid, palmitic acid, stearic acid, and lauric acid.

The synthetic softener includes synthetic resin softener, liquid rubber or oligomer, low-molecular plasticizer, polymer plasticizer, and reactive plasticizer.

The synthetic resin softener includes, for example, phenol aldehyde resin, styrene resin, and atactic polypropylene. The liquid rubber or oligomer includes, for example, polybutene, liquid butadiene rubber, liquid isoprene rubber, and liquid acrylonitrile butadiene rubber. The low-molecular plasticizer includes, for example, dibutyl phthalate, dioctyl phthalate, and tricresyl phosphate.

The content of this softener is preferably 1 to 30 parts by mass, more preferably 5 to 25 parts by mass, further more preferably 10 to 20 parts by mass based on 100 parts by mass of all the rubber components forming the adhesive layer. The content of 1 part by mass or more can sufficiently increase the modification degree of the modified diene polymer. The content of 30 parts by mass or less prevents the adhesive layer from softening too much. The softeners can be used alone selected from the above-mentioned softeners or in combination of one or more kinds.

Vulcanizer and Vulcanization Accelerator

The adhesive layer can contain a vulcanizer or contain the combination of a vulcanizer and a vulcanization accelerator to provide vulcanizability.

The vulcanizer includes sulfur, and the used amount of the vulcanizer is preferably 0.1 to 10 parts by mass, and more preferably 1.0 to 5 parts by mass in terms of sulfur content based on 100 parts by mass of the all the rubber components.

The vulcanization accelerator that can be used in the present invention is not particularly limited, including thiazole vulcanization accelerators such as M (2-mercaptobenzothiazole), DM (dibenzothiazolyl disulfide), and CZ (N-cyclohexyl-2-benzothiazolyl sulfenamide); and a guanidine vulcanization accelerators such as DPG (diphenylguanidine). The used amount of the vulcanization accelerator is preferably 0.1 to 5 parts by mass, and more preferably 0.2 to 3 parts by mass based on 100 parts by mass of the rubber components.

Optional Components

The adhesive layer can optionally contain filler, tackifier resin, stearic acid, zinc oxide, antioxidant, and the like in addition to the above-mentioned components.

Filler

As the filler, inorganic filler and/or carbon black are used. The inorganic filler is not limited in particular, preferably including wet silica, aluminum hydroxide, aluminum oxide, magnesium oxide, montmorillonite, mica, smectite, organic montmorillonite, organic mica, and organic smectite. These inorganic fillers may be used alone or in combination of two or more.

On the other hand, the carbon black can be optionally selected from ones conventionally used as filler for reinforcing rubbers and the like, including FEF, SRF, HAF, ISAF, SAF, and GPF.

When used, this filler preferably contain an inorganic filler together with a carbon black in a content of 5 parts by mass based on 100 parts by mass of the modified diene polymer from the viewpoint of the tackiness, the peel strength, and the like.

Tackifier Resin

The tackifier resin having the capability of providing tackiness to the adhesive layer includes, for example, a phenol resin, a terpene resin, a modified terpene resin, a hydrogenated terpene resin, a rosin resin, a C5- and a C9-petroleum resin, a xylene resin, a coumarone-indene resin, a dicyclopentadiene resin, and a styrene resin. Among these, a phenol resin, a terpene resin, a modified terpene resin, a hydrogenated terpene resin, and a rosin resin are preferable.

The phenol resin can include resins obtained by condensation of p-t-butylphenol and acetylene in the presence of a catalyst and resins obtained by condensation of an alkylphenol and formaldehyde. The terpene resin, the modified terpene resin, and the hydrogenated terpene resin can include terpene resins such as β-pinene resins and α-pinene resin, hydrogenated terpene resin obtained by hydrogenizing these resins, and modified terpene resins obtained by reacting terpene with phenol in the presence of a Friedel-Crafts catalyst or by condensing terpene and formaldehyde. The rosin resin can include a natural resin rosin and a rosin derivatives obtained by modifying the natural rosin through hydrogenation, disproportionation, dimerization, esterification, or liming.

These resins may be used alone or in combination of two or more kinds. Among these, phenol resins are preferable.

The tackifier resin is used in an amount of 5 parts by mass or more, more preferably 5 to 40 parts by mass, further more preferably 5 to 30 parts by mass based on 100 parts by mass of the modified diene polymer.

In particular, a phenol resin used as the tackifier resin and magnesium oxide used as the above-mentioned inorganic filler is preferable because the obtained adhesive layer exhibits excellent tackiness.

The adhesive layer can be prepared by mixing the above-mentioned components with, for example, a Banbury mixer, a roll, or the like.

The adhesive layer of the present invention thus obtained is used to bond the thermoplastic resin film to the carcass.

Thickness of Adhesive Layer

The thickness of the above-mentioned adhesive layer is preferably 5 to 200 μm, more preferably 10 to 150 μm, further more preferably 15 to 100 μm. The thickness of 5 μm or more can firmly bond the thermoplastic resin film to the carcass to successfully fulfill the function to improve the anti-crack property in the low-temperature environment. The thickness of 200 μm or less can achieve the weight saving of a pneumatic tire.

Method of Producing Pneumatic Tire

The method of producing the above-mentioned pneumatic tire 10 is not limited in particular. For example, the inner liner having the thermoplastic resin film, the adhesive layer, and the carcass are wrapped and overlaid around the circumferential face of a tire molding drum in this order. Around the carcass, a belt layer 4, a rubber member forming the tread part 5, and a rubber member forming the side wall part 6 are wrapped and overlaid. Subsequently, the drum is removed to obtain a green tire. Then, this green tire was vulcanized by heating at a temperature of 120° C. or more, preferably 125 to 200° C., more preferably 130 to 180° C. to obtain the pneumatic tire 10.

The process of wrapping and overlaying the inner liner, the adhesive layer, and the carcass around the circumferential face of a tire molding drum in this order as described above preferably includes a process of using a coating liquid of the adhesive layer composition as described below or a process of using an adhesive layer sheet.

Process of Using Coating Liquid of Adhesive Layer Composition

In this process, a coating liquid for the adhesive layer formed by dissolving an adhesive layer composition in a good solvent is applied to at least one of the outside surface of the inner liner 3 (when wrapped around a molding drum) and the inside surface of the carcass 2 (when wrapped around a molding drum). Subsequently, the inner liner 3 and the carcass 2 are wrapped and overlaid around on the circumferential face of the molding drum in this order. Around the carcass, a belt layer 4, a rubber member forming the tread part 5, and a rubber member forming the side wall part 6 are wrapped and overlaid. Then, the drum is removed to obtain a green tire.

As the good solvent, an organic solvent having a Hildebrand solubility parameter δ of 14 to 20 $MPa^{1/2}$ is used, which is a good solvent for rubber components. The organic solvent can include toluene, xylene, n-hexane, cyclohexane, chloroform, and methyl ethyl ketone. These organic solvents may be used alone or in combination of two or more kinds.

The concentration of the solid components in the coating liquid thus prepared is appropriately selected with consideration on the coating property and the handleability, generally falling within the range of 5 to 50% by mass and preferably 10 to 30% by mass.

Process of Using Adhesive Layer Sheet

In this process, the inner liner, the adhesive sheet, and the carcass may be wrapped and overlaid around on the circumferential face of a tire molding drum in this order. Alternatively, after an adhesive layer sheet is previously applied to at least one of the inner liner and the carcass, the inner liner and the carcass are wrapped and overlaid around on the circumferential face of a molding drum in this order.

EXAMPLES

The present invention will be described more specifically with reference to examples in the following. However, the present invention is not limited to the examples. The method of measuring and evaluating the properties will be explained first.

Measurement Method and Evaluation Method (1) Dynamic Storage Modulus E' at −20° C.

The dynamic storage modulus (E') of each sample (size: 5 mm, length: 40 mm) was measured at −20° C. with a spectrometer available from Ueshima Seisakusho Co., Ltd. at an initial strain of 10%, a dynamic strain of 0.1%, and a frequency of 15 Hz.

(2) Tg

The modified diene polymer was measured while the temperature was increased at 15° C./minute after cooled to −150° C. with a differential scanning calorimeter (DSC) "RDC220" available from SEIKO. The tangents to the baseline were drawn before and after a peak in the DSC curve. The temperature of the middle point between two tangents was read and defined as Tg.

(3) Epoxidation Rate of EBR

An EBR was dissolved in deuterated chloroform. The rate h(ppm) of integrated value of the carbon-carbon double bond moiety to that of the aliphatic moiety was determined by nuclear magnetic resonance (NMR (JNM-ECA series available from JEOL Ltd.)) spectrochemical analysis. Then, the epoxidation rate was calculated from by using the following expression.

$$\text{Epoxidation rate}(E\ \%)=3\times h(2.69)/(3\times h(2.69)+3\times h(5.14)+h(0.87))\times 100$$

(4) Presence of Cracks after Drum Test Run

The tires inflated at an internal air pressure of 140 kPa were pressed to a drum rotating at a driving speed of 80 km/h under a load of 6 kN and run 1,000 km at −20° C. The appearance of the inner liner of the tire after the drum run was visually observed to evaluate the presence of cracks.

(5) Gas Barrier Property of Tire after Drum Test Run

Two sample pieces with a size of 10 cm×10 cm were cut out from the side face of the tire, subjected to humidity conditioning at 20° C. and 65% RH for 5 days to measure their oxygen transmission rates at 20° C. and 65% RH in accordance with the method described in JIS-K7126 (isopiestic method) with a "MOCON OX-TRAN2/20" available from MODERNCONTROLS, INC. The average of the oxygen transmission rates (unit: $mL/m^2 \cdot day \cdot atm$) was determined and expressed with an index of 100 representing the average of oxygen transmission rate of a sample of the multi-layered laminate obtained in Comparative Example 1 to evaluate the gas barrier property. A lower index value shows more excellent gas barrier property.

(6) Characteristics of Ethylene-Vinyl Alcohol Copolymer (EVOH)

The content of ethylene and the saponification degree of the EVOH were calculated based on a spectrum obtained by the measurement of $^1$H-NMR [with a JNM-GX-500 type, available from NIPPON DENSHI Co., Ltd.] using deuterated dimethyl sulfoxide as the solvent.

For the measurement of the melt flow rate (MFR) of the EVOH, the sample was introduced into a cylinder having an inner diameter of 9.55 mm and a length of 162 mm of a MELT INDEXER L244 (available from TAKARA KOGYO Co., Ltd.) and melted at 190° C. The melted sample was subjected to a uniform load by using a plunger having a weight of 2,160 g and a diameter of 9.48 mm to be extruded from an orifice having a diameter of 2.1 mm formed at the center of the cylinder. The MFR was determined from the amount of the extruded resin per unit time (g/10 minutes). When the melting point of the EVOH is 190° C. or more, the MFR was determined at a plurality of temperatures higher than the melting point under a load of 2,160 g. The obtained data were plotted on a semi-logarithmic graph with the inverse of the absolute temperature as the horizontal axis and the logarithm of the determined MFR as the vertical axis, and the value obtained by extrapolation at 190° C. was determined as the melt flow rate (MFR) to be obtained.

Preparation Example 1

Preparation of Inner Liner (5-Layered Film)

Through the use of an EVOH (E105 available from KURARAY Co., Ltd.) and a thermoplastic polyurethane (TPU) (KURAMIRON 3190 available from KURARAY Co., Ltd.), a 5-layered film (TPU/EVOH/TPU/EVOH/TPU layers) was prepared by coextrusion under the following condition with a 5-layer extruder capable of extruding two types of materials. The thicknesses of the layers are 2 μm/20 μm/2 μm/20 μm/10 μm, respectively.

Extrusion temperatures of resins: C1/C2/C3/C4/C5/die=170/170/170/220/220/220° C.

Type of Extruder for Resins:

TPU: extruder 25 mmϕ, P25-18AC (available from OSAKA SEIKI KOSAKU Co., Ltd.)

EVOH: laboratory extruder 20 mmϕ (ME type), CO-EXT (available from TOYO SEIKI Co., Ltd.)

T-die: extruder (width: 500 mm) used for a 5-layered film containing two types of materials (available from PLASTIC KOGAKU KENKYUSHO Co., Ltd.)

Temperature of cooling roll: 50° C.

Speed of winding: 4 m/minute

The gas barrier property of this inner liner was measured by the above-mentioned measurement method. The results are shown in Table 1.

Preparation Example 2

Preparation of Inner Liner (21-Layered Film)

Through the use of an EVOH (E105 available from KURARAY Co., Ltd.) and a thermoplastic polyurethane (TPU) (KURAMIRON 3190 available from KURARAY Co., Ltd.), a 21-layered film (TPU/EVOH . . . /EVOH/TPU layers, including 11 TPU layers and 10 EVOH layers) was prepared by coextrusion under the following condition with a 21-layer extruder capable of extruding two types of materials. The thickness of each TPU layer is 2 μm, and the thickness of each modified EVOH layer is 1 μm.

A multi-layer film with 21 layers was extruded at a feed block temperature of 210° C. and a die temperature of 208° C.

Type of Extruder for Resins:

TPU: extruder 25 mmϕ, P25-18AC (available from OSAKA SEIKI KOSAKU Co., Ltd.)

EVOH: laboratory extruder 20 mmϕ (ME type), CO-EXT (available from TOYO SEIKI Co., Ltd.)

T-die: extruder (width: 500 mm) used for a 21-layered film containing two types of materials (available from PLASTIC KOGAKU KENKYUSHO Co., Ltd.)

Temperature of cooling roll: 50° C.

Speed of winding: 4 m/minute

The gas barrier property of this inner liner was measured by the above-mentioned measurement method. The results are shown in Table 1.

Preparation Example 3

Preparation of Carcass

The following rubber composition for a carcass was prepared.

Rubber Composition for Carcass

NR: 50 parts by mass

SBR (SBR1712 available from JSR Co., Ltd): 68.75 parts by mass GPF N-660 (carbon black) (50S available from ASAHI CARBON Co., Ltd): 43 parts by mass Process oil (Sundex available from SUN OIL COMPANY): 8 parts by mass Antioxidant (Nocrac224-S available from OUCHI SHINKO KAGAKU KOGYO Co., Ltd.): 1.5 parts by mass Stearic acid (available from ASAHI DENKA KOGYO Co., Ltd): 1.5 parts by mass Vulcanization accelerator (Accel M available from Kawaguchi Chemical Industry Co., LTD.): 0.5 parts by mass Vulcanization accelerator (Accel CZ available from Kawaguchi Chemical Industry Co., LTD.): 1 part by mass Zinc oxide (available from HIGHTECH): 4 parts by mass
Sulfur (available from KARUIZAWA SEIRENSHO Co., Ltd.): 2.66 parts by mass Apart of the above-mentioned rubber composition for a carcass was vulcanized by heating at 160° C. for 20 minutes, and then the dynamic storage modulus $E_3'$ at −20° C. was measured by the above-mentioned measurement method. The results are shown in Table 1.

Preparation Example 4

Preparation of Epoxidized Butadiene Rubber (EBR (1))

100 g of BR-150B (high cis BR available from UBE INDUSTRIES LTD.) was cut out into granules, each of which has a size of about 0.5 g, added in 1200 mL of toluene in a 5 L glass container, and dissolved with being stirred for 24 hours. Subsequently, 2 mL of formic acid was added in the solution, and the solution was heated to 50° C. in a water bath. While the solution was stirred, 60 g of a 30% by mass of an aqueous hydrogen peroxide solution was added dropwise for 30 minutes. After the dropwise addition ended, the solution was continuously stirred while the temperature was maintained at 50° C. Then, 0.3 g of BHT (dibutyl hydroxy toluene) was added 5 hours later. After cooled to room temperature, the reaction solution was added in 5 L of methanol to precipitate a rubber component. The precipitate was spread over a wide tray, and dried in air for 24 hours and then under reduced pressure to obtain 99 g of EBR (1). The epoxidation rate of this EBR (1) was calculated by the above-mentioned method to be 23.2% by mole.

Preparation Example 5

Preparation of Epoxidized Butadiene Rubber (EBR (2))

100 g of BR-150B (high cis BR available from UBE INDUSTRIES LTD.) was cut out into granules, each of which has a size of about 0.5 g, added in 1200 mL of toluene in a 5 L glass container, and dissolved with being stirred for 24 hours. Subsequently, 6 mL of formic acid was added in the solution, and the solution was heated to 50° C. in a water bath. While the solution was stirred, 130 g of 30% by mass of an aqueous hydrogen peroxide solution was added dropwise for 30 minutes. After the dropwise addition ended, the solution was continuously stirred while the temperature was maintained at 50° C. Then, 0.3 g of BHT was added 7 hours later. After cooled to room temperature, the reaction solution was added in 5 L of methanol to precipitate a rubber component. The precipitate was spread over a wide tray, and dried in air for 24 hours and then under reduced pressure to obtain 99 g of EBR (2). The epoxidation rate of this EBR (2) was calculated by the above-mentioned method to be 48.5% by mole.

Examples 1 to 4 and Comparative Examples 1 and 2

(1) Preparation of Coating Liquid for Adhesive Layer

The components, the types and the amounts of which shown in table 1, were kneaded by a conventional method to obtain the respective adhesive solvents. Each of the obtained solvents was added, dissolved, or dispersed in 1,000 parts by mass of toluene (value δ: 18.2 MPa$^{1/2}$) to prepare a coating liquid for the adhesive layer.

The dynamic storage modulus $E_2'$ at −20° C. of the adhesive layer formed by using this coating liquid for the adhesive layer was measured by the following procedure. Apart of this coating liquid for the adhesive layer was applied to a mold release sheet (material: mold release-treated PET film, product name: NSD available from FUJI-MORI KOGYO CO., LTD.), dried at 80° C. for 2 minutes, and then vulcanized by heating at 160° C. for 20 minutes to obtain a sample with a thickness of 30 μm. The dynamic storage modulus $E_2'$ at −20° C. and the Tg of this sample were measured by the above-mentioned measurement method. The results are shown in Table 1.

(2) Preparation of Tire

The above-mentioned inner liner (5-layered film) formed by previously applying the coating liquid for the adhesive layer to a tire molding drum was wrapped around a tire molding drum so that the coated surface is faced to the carcass. Then, the above-mentioned carcass was wrapped around the above-mentioned inner liner. On this carcass, a belt layer, a rubber member for the tread part, and a rubber member for a side wall part were sequentially wrapped and overlaid. Then, the drum was removed to obtain a green tire.

This green tire was vulcanized by heating to prepare a pneumatic tire (195/65R15) as shown in FIGS. 1 and 2.

The gas barrier property and the presence of cracks of the obtained tire after drum test run were evaluated by the above-mentioned measurement method. The results are shown in Table 1.

TABLE 1

|  |  | Example 1 | Example 2 | Example 3 | Example 4 | Comparative Example 1 | Comparative Example 2 |
|---|---|---|---|---|---|---|---|
| Thermoplastic resin film | $E_1'$ (Pa) | 1.0E+09 | 1.0E+09 | 1.0E+09 | 1.0E+09 | 1.0E+09 | 1.0E+09 |
| Inner liner | The number of layers |  |  |  | 5 |  |  |
| Carcass | $E_3'$ (Pa) | 2.3E+07 | 2.3E+07 | 2.3E+07 | 2.3E+07 | 2.3E+07 | 2.3E+07 |
| Rubber layer sheet | $E_4'$ (Pa) |  |  | Not applicable |  |  |  |
| Coating liquid | ENR25[1] | 80 | — | 60 | — | 20 | — |
| composition for | ENR50[2] | 20 | — | 20 | — | 80 | — |
| adhesive layer | ENR10[3] | — | 80 | — | 60 | — | 20 |
| (part by mass) | ENR60[4] | — | 20 | — | 20 | — | 80 |
|  | NR(RSS#3) | — | — | 20 | — | — | — |
|  | BR[5] | — | — | — | 20 | — | — |
|  | Carbon black[6] | 30 | 30 | 30 | 30 | 30 | 30 |
|  | Stearic acid | 1 | 1 | 1 | 1 | 1 | 1 |
|  | Zinc oxide | 3 | 3 | 3 | 3 | 3 | 3 |
|  | Tackifier resin[7] | 5 | 5 | 5 | 5 | 5 | 5 |
|  | Antioxidant[8] | 1 | 1 | 1 | 1 | 1 | 1 |
|  | Vulcanization accelerator[9] | 1.5 | 1.5 | 1.5 | 1.5 | 1.5 | 1.5 |
|  | Sulfur | 1 | 1 | 1 | 1 | 1 | 1 |

TABLE 1-continued

|  |  | Example 1 | Example 2 | Example 3 | Example 4 | Comparative Example 1 | Comparative Example 2 |
|---|---|---|---|---|---|---|---|
| Adhesive layer | $E_2'$ (Pa) | 2.5E+08 | 3.0E+08 | 1.0E+08 | 9.0E+07 | 2.0E+09 | 4.0E+09 |
|  | Tg (° C.) | −25 | −20 | −30 | −35 | 5 | 10 |
| Tire | Cracks after drum test run | None | None | None | None | Some | Some |
|  | Gas barrier property (index) after drum test run | 25 | 20 | 30 | 35 | 100 | 110 |

Note:
[1] ENR25: Epoxidized natural rubber (product name: ENR25 available from RRIM) (epoxidation degree (epoxidation rate): 25% by mole)
[2] ENR50: Epoxidized natural rubber (product name: ENR50 available from RRIM Corp) (epoxidation degree (epoxidation rate): 50% by mole)
[3] ENR10: Epoxidized natural rubber (product name: ENR-10 available from Kumpulan Guthrie Berhad) (epoxidation degree (epoxidation rate): 10% by mole)
[4] ENR60: Epoxidized natural rubber (product name: ENR-60 available from MUANG MAI GUTHRIE) (epoxidation degree (epoxidation rate): 60% by mole)
[5] BR: BR01 available from JSR Co., Ltd
[6] Carbon black: SIEST NB available from TOKAI CARBON Co., Ltd
[7] Tackifier resin: KORESIN available from BASF AKTIENGESELLS, based on phenol
[8] Antioxidant: Antigen 6C available from Sumitomo Chemical Co. Ltd., chemical name: N-phenyl-N'-1,3-dimethylbutyl-p-phenylenediamine
[9] Vulcanization accelerator: NOCCELER CZ-G available from OUCHI SHINKO CHEMICAL INDUSTRIAL CO., LTD., chemical name: N-cyclohexyl-2-benzothiazole sulfenamide

Examples 5 to 8 and Comparative Examples 3 and 4

Except for using a 21-layered film instead of a 5-layered film as the inner layer and using the coating liquid for the adhesive layer shown in Table 2, the preparation and the measurement were conducted in the same manner as Example 1. The results are shown in Table 2.

TABLE 2

|  |  | Example 5 | Example 6 | Example 7 | Example 8 | Comparative Example 3 | Comparative Example 4 |
|---|---|---|---|---|---|---|---|
| Thermoplastic resin film Inner liner | $E_1'$ (Pa) The number of layers | 1.5E+09 | 1.5E+09 | 1.5E+09 | 1.5E+09 21 | 1.5E+09 | 1.5E+09 |
| Carcass | $E_3'$ (Pa) | 2.3E+07 | 2.3E+07 | 2.3E+07 | 2.3E+07 | 2.3E+07 | 2.3E+07 |
| Rubber layer sheet | $E_4'$ (Pa) |  |  | Not applicable |  |  |  |
| Coating liquid composition for adhesive layer (part by mass) | ENR25[1] | 80 | — | 60 | — | 20 | — |
|  | ENR50[2] | 20 | — | 20 | — | 80 | — |
|  | ENR10[3] | — | 80 | — | 60 | — | 20 |
|  | ENR60[4] | — | 20 | — | 20 | — | 80 |
|  | NR(RSS#3) | — | — | 20 | — | — | — |
|  | BR[5] | — | — | — | 20 | — | — |
|  | Carbon black[6] | 30 | 30 | 30 | 30 | 30 | 30 |
|  | Stearic acid | 1 | 1 | 1 | 1 | 1 | 1 |
|  | Zinc oxide | 3 | 3 | 3 | 3 | 3 | 3 |
|  | Tackifier resin[7] | 5 | 5 | 5 | 5 | 5 | 5 |
|  | Antioxidant[8] | 1 | 1 | 1 | 1 | 1 | 1 |
|  | Vulcanization accelerator[9] | 1.5 | 1.5 | 1.5 | 1.5 | 1.5 | 1.5 |
|  | Sulfur | 1 | 1 | 1 | 1 | 1 | 1 |
| Adhesive layer | $E_2'$ (Pa) | 2.5E+08 | 3.0E+08 | 1.0E+08 | 9.0E+07 | 2.0E+09 | 4.0E+09 |
|  | Tg (°C.) | −25 | −20 | −30 | −35 | 5 | 10 |
| Tire | Cracks after drum test run | None | None | None | None | Some | Some |
|  | Gas barrier property (index) after drum test run | 25 | 20 | 30 | 35 | 100 | 110 |

Examples 9 to 12 and Comparative Example 5

Except for using a 21-layered film instead of a 5-layered film as the inner layer and using the coating liquid for the adhesive layer shown in Table 3, the preparation and the measurement were conducted in the same manner as Example 1. The results are shown in Table 3.

TABLE 3

|  |  | Example 9 | Example 10 | Example 11 | Example 12 | Comparative Example 5 |
|---|---|---|---|---|---|---|
| Thermoplastic resin film Inner liner | $E_1'$ (Pa) The number of layers | 1.5E+09 | 1.5E+09 | 1.5E+09 | 1.5E+09 21 | 1.5E+09 |
| Carcass | $E_3'$ (Pa) | 2.3E+07 | 2.3E+07 | 2.3E+07 | 2.3E+07 | 2.3E+07 |

TABLE 3-continued

|  |  | Example 9 | Example 10 | Example 11 | Example 12 | Comparative Example 5 |
|---|---|---|---|---|---|---|
| Rubber layer sheet | $E_4'$ (Pa) |  |  | Not applicable |  |  |
| Coating liquid composition for adhesive layer (part by mass) | EBR (1) | 20 | 80 | 80 |  |  |
|  | EBR (2) | 80 | 20 |  | 80 |  |
|  | ENR10 |  |  |  | 20 | 20 |
|  | ENR50 |  |  | 20 |  | 80 |
|  | Carbon black | 30 | 30 | 30 | 30 | 30 |
|  | Antioxidant | 1 | 1 | 1 | 1 | 1 |
|  | Stearic acid | 1 | 1 | 1 | 1 | 1 |
|  | Zinc oxide | 3 | 3 | 3 | 3 | 3 |
|  | Sulfur | 1 | 1 | 1 | 1 | 1 |
|  | Vulcanization accelerator (1) | 1.5 | 1.5 | 1.5 | 1.5 | 1.5 |
| Adhesive layer | $E_2'$ (Pa) | 8.0E+07 | 5.5E+07 | 7.0E+07 | 8.5E+07 | 1.5E+09 |
|  | Tg (° C.) | −30 | −50 | −45 | −25 | 10 |
| Tire | Cracks after drum test run | None | None | None | None | Some |
|  | Gas barrier property (index) after drum test run | 15 | 25 | 18 | 20 | 100 |

The agents shown in Table 3 are as follows.
EBR (1)-(2): prepared in the above-mentioned preparation examples Carbon black: SHOWBLACK N220 available from Cabot Corporation (N2SA: 125 m²/g)
ENR10, ENR50: the same as shown in Table 1
Antioxidant: Nocrac 6C available from OUCHI SHINKO KAGAKU KOGYO Co., Ltd., chemical name: (N-1,3-dimethylbutyl)-N'-phenyl-p-phenylene-diamine) Stearic acid: available from NOF CORPORATION Zinc oxide: Zinc oxide #1 available from MITSUI MINING AND SMELTING CO., LTD
Sulfur: Powdery sulfur available from TSURUMI KAGAKU Co., Ltd Vulcanization accelerator (1): NOCCELER CZ-G (N-t-butyl-2-benzothiazolyl sulfenamide) available from OUCHI SHINKO CHEMICAL INDUSTRIAL CO., LTD.

Results

As shown in Table 1 (major component of adhesive layer: ENR, 5 layers in inner liner), Examples 1 to 4 satisfying the requirement of "$E_1'>E_2'>E_3'$" had excellent anti-crack property and gas barrier property after drum test run, compared with Comparative Examples 1 and 2 unsatisfying this requirement. As shown in Table 2 (major component of adhesive layer: ENR, 21 layers in inner liner), Examples 5 to 8 satisfying the requirement of "$E_1'>E_2'>E_3'$" had excellent anti-crack property and gas barrier property after drum test run, compared with Comparative Examples 3 and 4 unsatisfying this requirement. As shown in Table 3 (major component of adhesive layer (except Comparative Example 5): EBR, 21 layers in inner liner), Examples 9 to 12 satisfying the requirement of "$E_1'>E_2'>E_3'$" had excellent anti-crack property and gas barrier property after drum test run, compared with Comparative Example 5 unsatisfying this requirement.

REFERENCE NUMERALS 1 bead core
2 carcass
3 inner liner
4 belt part
5 tread part
6 side wall part
7 adhesive layer
10 pneumatic tire

The invention claimed is:

1. A pneumatic tire comprising:
an inner liner having a thermoplastic resin film, a carcass, and an adhesive layer disposed between the inner liner and the carcass, wherein
the dynamic storage modulus E's at −20° C. of the thermoplastic resin film, the adhesive layer, and the carcass are defined as $E_1'$, $E_2'$, and $E_3'$, respectively, and the relationship among $E_1'$, $E_2'$, and $E_3'$ satisfies $E_1'>E_2'>E_3'$,
the adhesive layer contains a modified diene polymer with a glass transition temperature of 0° C. or less,
the adhesive layer contains two or more kinds of modified diene polymers with different epoxidation rates,
the two or more kinds of modified diene polymers with different epoxidation rates comprises a low epoxidation rate modified diene polymer with an epoxidation rate of 5 to 30% by mole and a high epoxidation rate modified diene polymer with an epoxidation rate of 40 to 90% by mole, and
a content ratio of a content of the low epoxidation rate modified diene polymer to a content of the high epoxidation rate modified diene polymer is 20:80 to 80:20.

2. The pneumatic tire according to claim 1, wherein the thickness of the adhesive layer is 5 to 200 μm.

3. The pneumatic tire according to claim 1, wherein each of the two or more kinds of the modified diene polymer is selected from the group consisting of an epoxidized natural rubber, an epoxidized polyisoprene rubber, and an epoxidized polybutadiene rubber.

4. The pneumatic tire according to claim 1, wherein the inner liner is a multi-layer film with 5 or more layers.

5. The pneumatic tire according to claim 4, wherein the inner liner is a multi-layer film with 21 or more layers.

6. The pneumatic tire according to claim 1, wherein the inner liner contains the thermoplastic resin film with one or two or more layers; and one or two or more layers formed of a resin composition containing an elastomer.

* * * * *